United States Patent [19]
Dimatteo et al.

[11] Patent Number: 5,822,827
[45] Date of Patent: Oct. 20, 1998

[54] VARIABLE PRESSURE WINDSHIELD WIPER SYSTEM

[75] Inventors: Michael Anthony Dimatteo, Kettering, Ohio; Daniel Lee Harmon, Lake Orion, Mich.; Deno John Rogakos, deceased, late of Centerville, Ohio, by Niki Rogakos, administrator

[73] Assignee: ITT Automotive Electrical Inc., Auburn Hills, Mich.

[21] Appl. No.: 804,243

[22] Filed: Feb. 20, 1997

[51] Int. Cl.⁶ .................................. B60S 1/32; B60S 1/34
[52] U.S. Cl. ........................................................ 15/250.203
[58] Field of Search ....................... 15/250.202, 250.203, 15/250.351, 250.34, 250.19

[56] References Cited

U.S. PATENT DOCUMENTS

| | | | |
|---|---|---|---|
| 3,026,555 | 3/1962 | Dudley | 15/250.202 |
| 4,439,886 | 4/1984 | Yagasaki et al. | 15/250.203 |
| 4,472,854 | 9/1984 | Bauer et al. | 15/250.202 |
| 4,698,872 | 10/1987 | Watanabe | 15/250.203 |
| 4,736,484 | 4/1988 | Baver et al. | 15/250.203 |
| 4,993,102 | 2/1991 | Honda et al. | 15/250.202 |
| 5,390,391 | 2/1995 | Zimmer et al. | 15/250.202 |

FOREIGN PATENT DOCUMENTS

| | | | |
|---|---|---|---|
| 2679505A1 | 1/1993 | France . | |
| 3428710 | 2/1986 | Germany | 15/250.203 |
| 55-160637 | of 1980 | Japan . | |
| 59-145647 | of 1984 | Japan . | |
| 61-166754 | of 1986 | Japan . | |
| 62-231856 | 10/1987 | Japan | 15/250.203 |

*Primary Examiner*—Gary Graham
*Attorney, Agent, or Firm*—J. Gordon Lewis; Thomas N. Twomey

[57] ABSTRACT

A variable force windshield wiper system for an automobile has a rod which is slidably received within a bore of the drive shaft of the wiper system. The end of the rod contacts a lever arm when the rod extends out from the drive shaft. The lever arm is connected to a spring. The other end of the spring is connected to the windshield wiper arm. As the distance of the rod outside the drive shaft increases, the lever arm rotates about a fulcrum and extends the spring thereby increasing the downward force of the wiper arm toward the windshield. To move the rod, a cam having a threaded exterior surface is mounted on the drive shaft and is attached to the rod. A nut having a threaded interior surface engages the threads of the cam. The nut and cam rotate together if no wiper force change is desired The exterior surface of the nut has ratchet teeth. A pawl is used to selectively engage the ratchet teeth of the nut. When an increase or decrease in force for the wiper arm is desired, the pawl is used to engage the ratchet surface to prevent the nut from rotating. The cam will travel up or down the drive shaft when the nut is prevented from rotating. As the cam moves relative to the drive shaft, the rod moves the lever arm.

6 Claims, 5 Drawing Sheets

VARIABLE PRESSURE WINDSHIELD WIPER SYSTEM

BACKGROUND OF THE INVENTION

1. Technical Field

The present invention relates generally to a windshield wiper system, and more particularly, to a windshield wiper system that is adjustable to compensate for wind force particularly at high speeds.

2. Discussion of the Related Art

As the speed of a vehicle increases, the air impinging on the windshield increases the tendency for the wiper blades to lift from the windshield. A wiper blade that has lifted from the windshield does not effectively clear the windshield.

Several solutions have been proposed to solve the above-stated problem. One solution is to provide an air deflector that connects directly to the wiper arm. The position, however, of an air deflector on the windshield wiper system is fixed. As the windshield wiper blade sweeps across the windshield, the position of the air deflector changes relative to the airflow. Therefore, a constant amount of force is not placed by the wiper blade on the surface of the windshield. As a result of the varying force, the windshield may not be cleared effectively.

Other solutions include manually varying the amount of force of the blade against the windshield applied by the windshield wiper arm. Several problems are present in existing solutions. One problem is that a manually adjusted arm force does not account for varying vehicle speeds. If the wiper blade arm force is improperly adjusted, i.e., if too much force is provided to the wiper blade during low speed operation, the wiper blade may experience premature wear. Likewise, if too little force is provided by the wiper arm, the wiper blade may lift off the windshield at high speeds and not properly clear the windshield.

SUMMARY OF THE INVENTION

It is therefore an object of the present invention to provide a method for varying the force on the windshield wiper blade to compensate for different load requirements.

One advantage of the present invention is that since a variety of operating parameters of the vehicle and the wiper system are monitored, the operating force of the wiper blade arm can be continuously varied during vehicle operation, responsive to the operating parameters, providing an optimum windshield wiper blade force against the windshield.

The present invention generally has a drive shaft, rotatable about a first axis, has a drive arm and a wiper arm connected to the drive shaft for unitary rotation therewith. The wiper arm has a portion pivotable about a second axis substantially perpendicular to the first axis. A wiper blade is disposed at an end of the wiper arm for movement therewith. A spring has a first end engaging the wiper arm and biases the wiper blade against the windshield. An adjustment mechanism disposed between the drive shaft and a second end of the spring controls the length of the spring and thus the force provided by the spring.

The adjustment mechanism includes a lever arm rotatably connected to the wiper arm. One end of the lever arm is connected to the spring. The other end of the lever arm contacts a rod slidably received within a bore of the drive shaft. As the rod extends out from the drive shaft, the rod rotates one end of the lever arm and the other end of the lever arm stretches the spring. Because the spring is connected to the windshield wiper arm, the force of the wiper blade on the windshield increases. As the distance of the rod outside the drive shaft increases, the lever arm rotates and increases the biasing force of the wiper blade against the windshield.

To move the rod, a screw having a threaded exterior surface is mounted on the drive shaft and attached to the rod by a pin connected through an elongated slot in the drive shaft so that the shaft rotates the screw. The screw and pin assembly can move axially on the drive shaft along the slot. The pin engages the rod to move the rod out of the end of the drive shaft. The maximum distance of the rod from the shaft corresponds to the length of the elongated slot. A nut having a threaded interior surface engages the threads of the screw. The nut stays in a fixed axial position with respect to the drive shaft but can rotate. The exterior surface of the nut has a ratchet tooth defining a ratchet surface. A pawl connected to a miniature motor is used to selectively engage the ratchet surface of the nut. If no change in the wiper blade force is desired, the pawl does not engage the ratchet surface. In this situation, the nut and screw move together around the drive shaft. When an increase or decrease in force of the wiper blade is desired, the pawl is used to engage the ratchet surface to prevent the rotation of the nut. In such a situation, the nut is prevented from rotating while the screw is allowed to rotate with the drive shaft. The screw and pin will then travel axially with the drive shaft. As the screw and pin move relative to the drive shaft, the pin pushes against the rod to either extend the rod from the drive shaft or retract the rod into the drive shaft. The biasing force on the wiper arm on the windshield is thereby either decreased or increased.

In one aspect of the invention, the pawl movement is controlled by a microprocessor. The microprocessor determines the optimum amount of force to be applied to the windshield. Various parameters may be factored into the considerations such as speed of the wiper system, the rotational position of the drive shaft, the speed of the vehicle and the position of the nut and screw.

BRIEF DESCRIPTION OF THE DRAWINGS

Other objects and advantages of the present invention will become apparent from the following detailed description which should be read in conjunction with the drawings in which.

DETAILED DESCRIPTION OF THE PREFERRED EMBODIMENT

Figure 1:
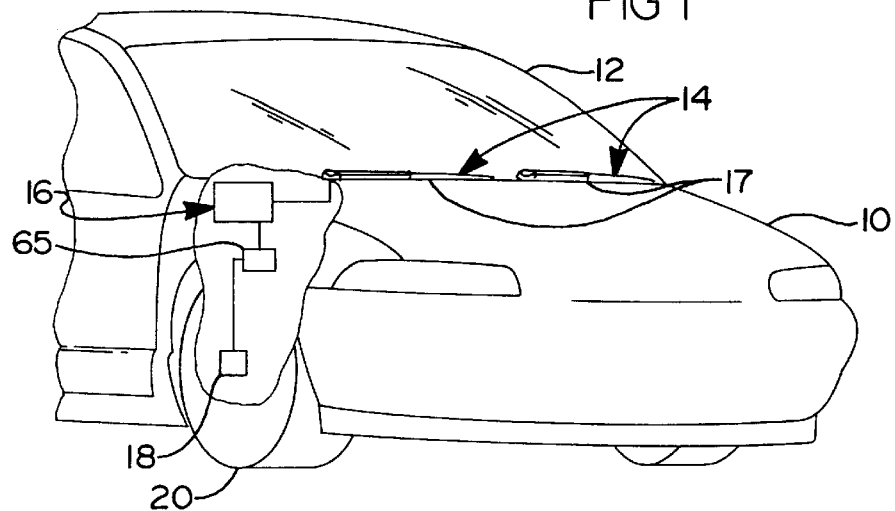
FIG. 1 is a partially cutaway perspective view of an automobile having a windshield wiper system according to the present invention.

Referring to FIG. 1, an automotive vehicle 10 is shown having a windshield 12 and windshield wipers 14. Windshield wipers 14 are controlled by a variable pressure wiper control system 16. Windshield wipers 14 include a conventional wiper blade 17 attached thereto. A speed sensor 18 is connected between variable force wiper control system 16 and a speed-measuring position such as a wheel 20. A wheel 20 is used for illustrative purposes only. One skilled in the art would recognize various positions in the vehicle for obtaining vehicle speed including directly from the engine control module.

Figure 3:
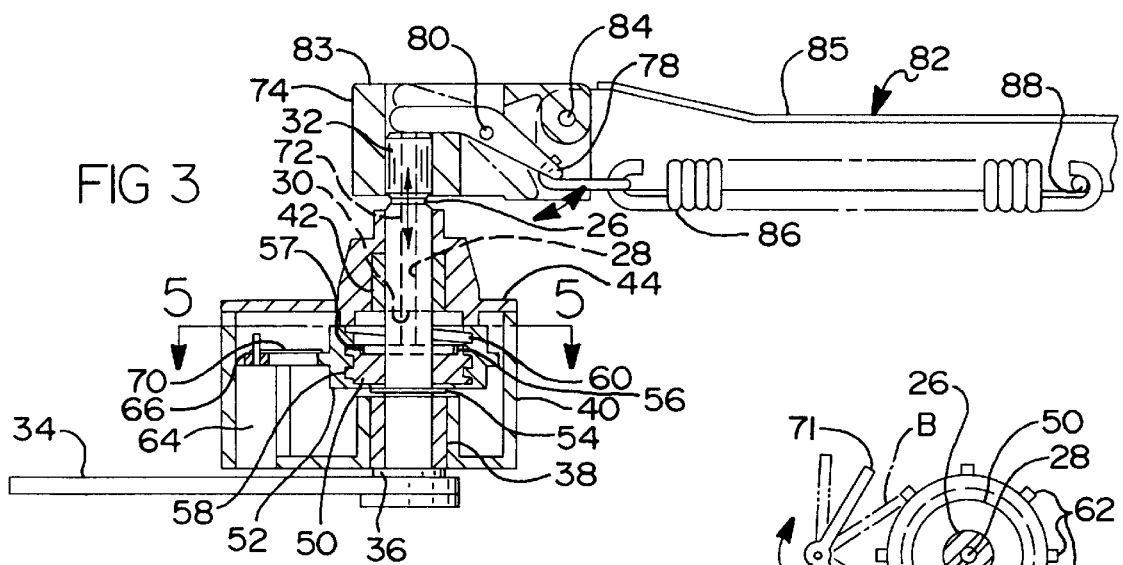
FIG. 3 is a cross sectional view of the windshield wiper system according to the present invention.
Figure 2:
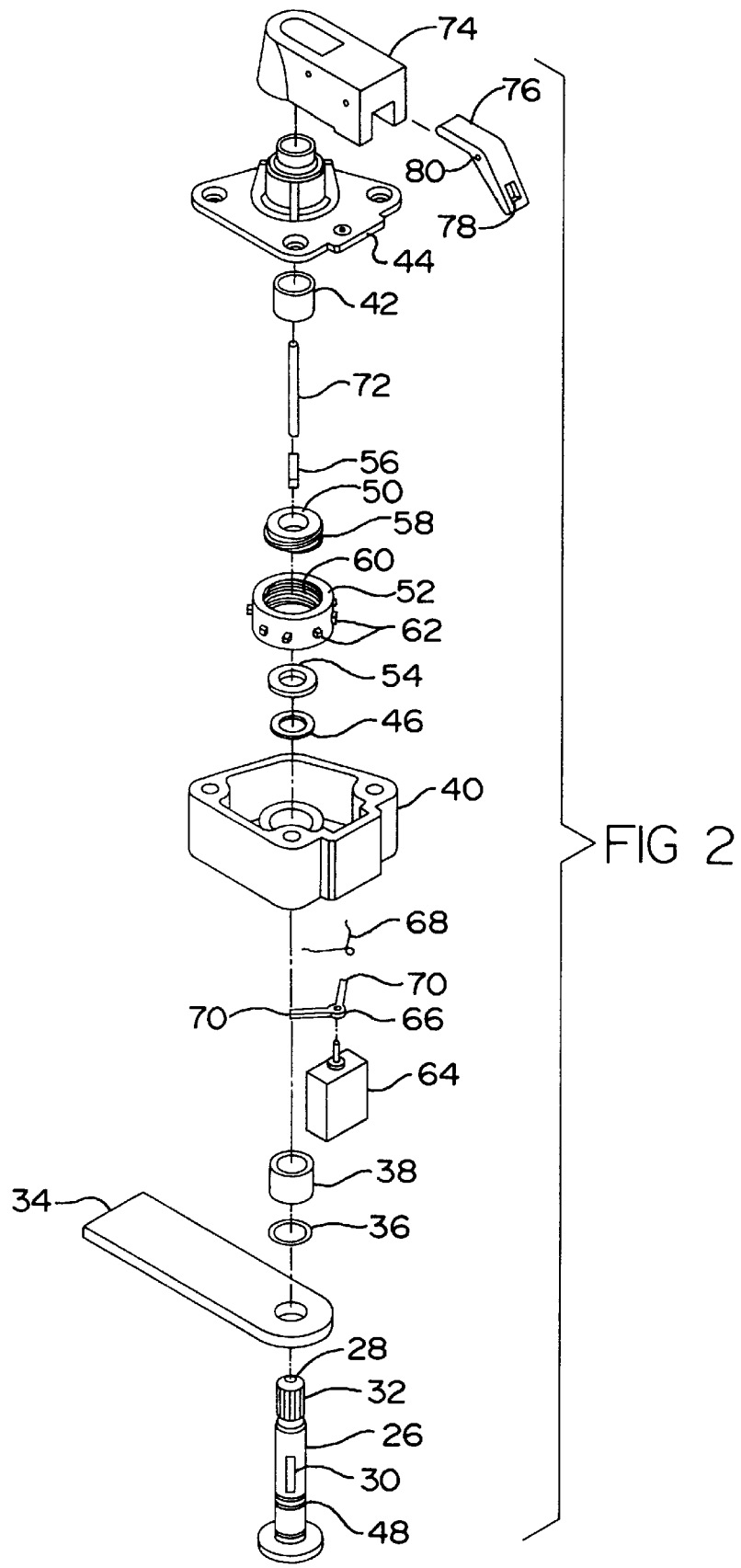
FIG. 2 is an exploded view of the windshield wiper system according to the present invention.

Referring to FIGS. 2 and 3, a drive shaft 26 is coupled to a windshield wiper arm 82 and to a drive arm 34. A wiper motor 27, shown in FIG. 7 in schematic form and selectively energized by a voltage source 29 acting through a relay 31, connects to drive arm 34 to rotate drive shaft 26 in both clockwise and counter clockwise directions to provide the back and forth movement of wipers in a conventional manner. Windshield wiper arm 82 and windshield wiper blade 17 attached thereto moves with drive shaft 26. Windshield wiper arm 82 includes a cast head portion or head casting 74 and an extension portion 85 pivotally connected to the head casting 74 by a pivot pin 84.

The force biasing the wiper arm 82 toward the windshield is provided by steel coil tension spring 86 with one end connected to an adjustment mechanism 87 and with the other end connected to an attachment point 88 on extension portion 85. The adjustment mechanism 87 is coupled to drive shaft 26 and controls the elongation of spring 86. As spring 86 stretches, the force of wiper blade 17 against the windshield 12 is increased.

Drive shaft 26 has an axial bore 28, preferably through its center. The adjustment mechanism has a rod 72 housed within bore 28 of drive shaft 26, a lever arm 76 connected to windshield wiper arm 82 and a means to move rod 72. Movement of rod 72 displaces one end of lever arm 76, causing lever arm 76 to rotate about a fulcrum defined by a pin 80. The other end of lever arm 76 is connected to spring 86 by a spring catch 78. In FIG. 2 spring catch 78 is shown integrated into lever arm 76. Rotation of lever arm 76 varies the length of spring 86 and the force induced by spring 86.

A lower housing 40 and an upper housing 44 are used to enclose the means for axially displacing rod 22 within bore 28. A spring washer 36 between housing 40 and drive arm 34 maintains an axial bias on shaft 26. A lower bearing 38 rotatably supports shaft 26 within lower housing 40. Similarly, upper bearing 42 rotatably supports shaft 26 within upper housing 44. A spring clip 46 fits in groove 48 to axially retain drive shaft 26 within housing 40 and 44.

Lower housing 40 and upper housing 44 also enclose a threaded cam 50, a nut 52 and a thrust washer 54. A pin 56 extends transversely through an axially elongated slot 30 in drive shaft 26. As can be seen in FIG. 2, pin 56 has a square cross section. Ends of pin 56 are disposed in notches 57 in an upper of surface of cam 50, rotatably fixing cam 50 to drive shaft 26. Pin 56 is engaged near its middle by an end of rod 72. Cam 50, pin 56 and rod 72 all move together in an axial direction with respect to drive shaft 26.

Axial movement of cam 50 is the result of relative rotation between cam 50 and nut 52. The outer surface of cam 50 has outer acme threads 58. Nut 52 has inner acme threads 60 that mesh with threads 58 of cam 50. Nut 52 is axially fixed within housing 40 and 44 between thrust washer 54 and upper housing 44. Cam 50 is free to move within a predetermined axial range in the housing. This combination produces the desired axial displacement of cam 50, pin 56 and rod 72 with relative cam 50 to nut 52 rotation. Because the acme thread configuration resists being back-driven by the force from spring 86 applied through rod 72, nut 50 rotates with cam 50 as long as no significant torsional resistance is applied to nut 52. Cam 50, rotatively fixed to shaft 26 by pin 56, therefore rotates with shaft 26 when the windshield wipers are reciprocating. If nut 52 is prevented from rotating with cam 50, cam 50 will travel in an axial direction along drive shaft 26 on threads 58 and 60. Engagement projections or ratchet teeth 62, extending from the outer surface of nut 52, are used to restrict the movement of nut 52. As shown, six teeth 62 are provided, however a greater or lesser number may be employed. A pawl 66 is used to selectively engage teeth 62 to prevent nut 52 from rotating.

Also housed within lower housing 40 and upper housing 44 are a motor 64 and a release spring 68 which are used to control engagement and disengagement of pawl 66 with ratchet teeth 62 on nut 52. Pawl 66 has two arms 70 to engage ratchet teeth 62, one arm 70 for resisting nut rotation in each direction. Spring 68 biases pawl 66 to a disengaged position shown in solid lines in FIG. 5. Motor 64 is used to overcome the force of spring 68 to alternatively rotate the pawl 66 in either a clockwise or counter clockwise direction, causing nut 52 to remain stationary while cam 50 rotates with drive shaft 26, thereby increasing or decreasing wiper force against the windshield.

Motor 64 is operated by a relay 67 in turn operated by a controller 65 that includes a microprocessor. Controller 65 has various inputs and outputs to determine the proper force of the windshield wipers against the windshield of the vehicle. Inputs may include, for example, the speed at which the wiper system is operating, the rotational position of the drive shaft and the position of the screw with respect to the nut. Each input is sensed in a conventional manner. In response to these inputs, pawl 66 is controlled by motor 64.

Head casting 74 is secured to drive shaft 26 at shaft end 32. Shaft end 32 includes an anti-rotation feature, such as splines, serrations, or knurling to help prevent relative rotation between drive shaft 26 and head casting 74. Fulcrum 80, about which lever arm 76 pivots, is fixed in head casting 74 substantially in parallel with pivot pin 84.

Figure 4:
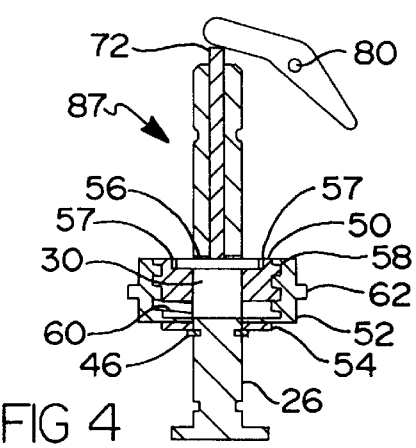
FIG. 4 is a cross sectional view through the drive shaft and the rod.

FIG. 3 shows cam 50 in a lowermost position, and FIG. 4 shows cam 50 in an uppermost position with respect to nut 52. Nut 52 must be axially sized to permit the travel of cam 50 fully for the desired range within nut 52.

When rod 72 extends out of drive shaft 26 responsive to an upward displacement of cam 50, as shown in FIG. 4, lever arm 76 rotates about fulcrum 80 in a clockwise direction to the position shown. The clockwise movement causes spring 86 to increase in length, thereby increasing the force at attachment point 88 and also shifting the location of the end of spring 86 at spring catch 78 downward, away from pivot point 84. The resultant force at attachment point 88 has an increased downward vector component normal to the direction of windshield 12, increasing the force of wiper blade 17 against windshield 12.

Figure 5:
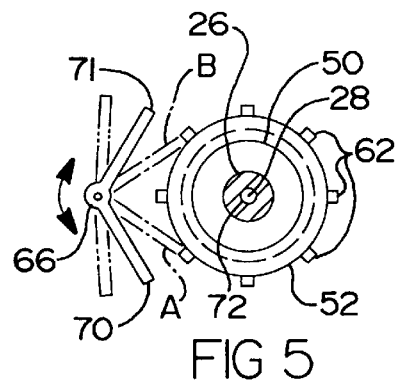
FIG. 5 is a top view of various positions of the ratchet and pawl assembly in relation to the drive shaft.

We now refer to FIG. 5 to consider the operation of pawl 66. Pawl 66 is shown in a released position in solid lines. In the released position, nut 52 and cam 50 rotate as a unit on drive shaft 26, and lever arm 76 does not change its position. As shown in phantom lines in the counter clockwise-most position indicated by letter A, pawl arm 70 is engaged with one of ratchet teeth 62, preventing nut 52 from rotating in a clockwise direction corresponding to downward wiper motion for the mounting arrangement shown. Therefore, with threads 58 and 60 being right-hand threads, wiper motion in the downward direction will cause a decrease in force when pawl 66 engages ratchet tooth 62 in position A. Of course, if threads 58 and 60 were left-hand threads, wiper motion in the downward direction would cause an increase in force. As shown by the phantom lines in the clockwise-most direction indicated by the letter B, pawl arm 70 is engaged with a ratchet tooth 62 to prevent nut 52 from rotating in a counter clockwise direction corresponding to upward wipe motion. This produces an increase in force with upward wiper motion when pawl 66 engages tooth 62 in position B. If threads 58 and 60 are left-hand threads, instead of right hand threads, wiper motion in the upward direction will produce a decrease in force. Because drive shaft 26 moves only during a wipe operation, the windshield wiper blade force is only adjusted during a wipe cycle.

Figure 6A:
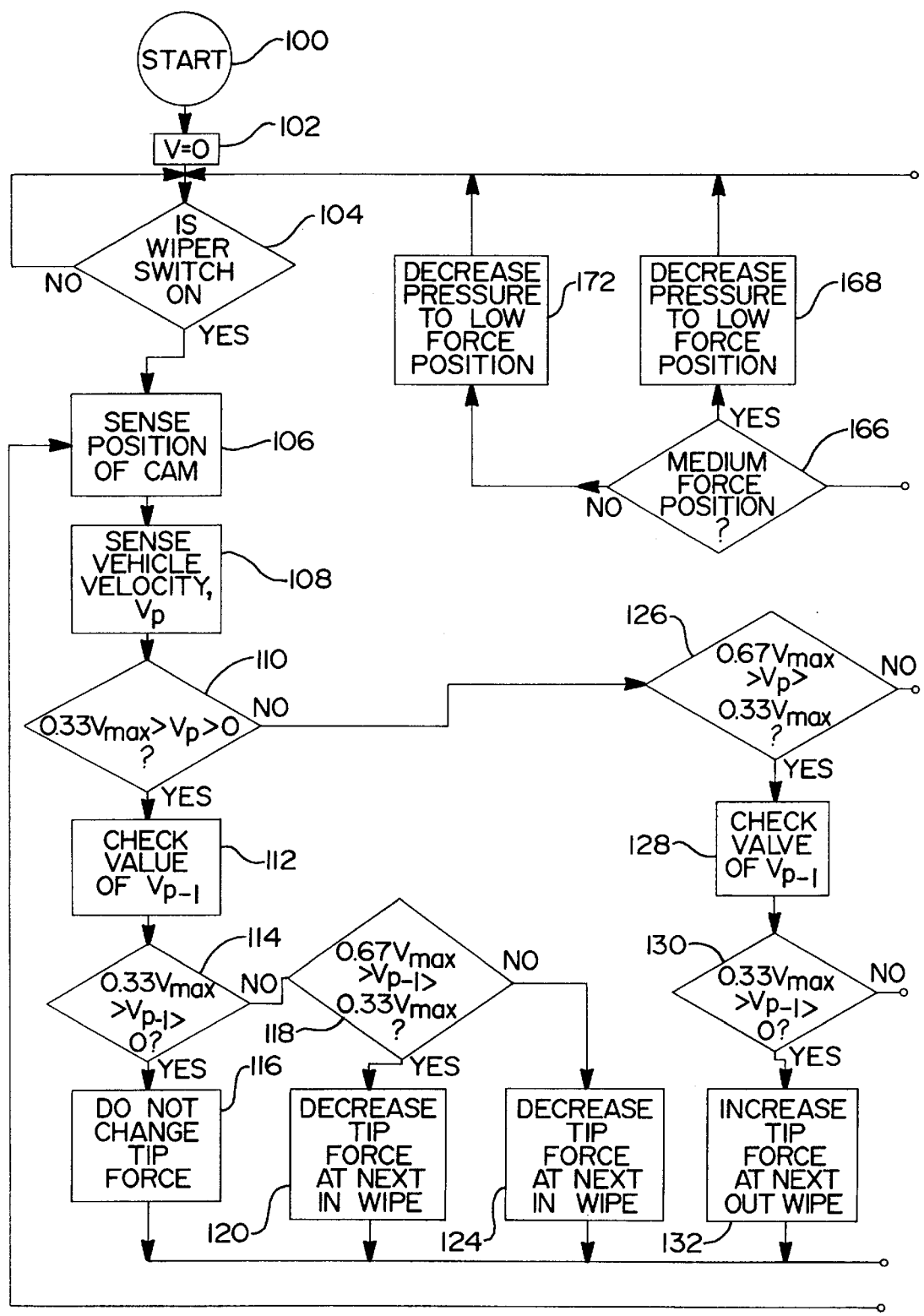
FIGS. 6(a) and 6(b) are a flow chart of the operation of the wiper system according to the present invention.
Figure 6B:
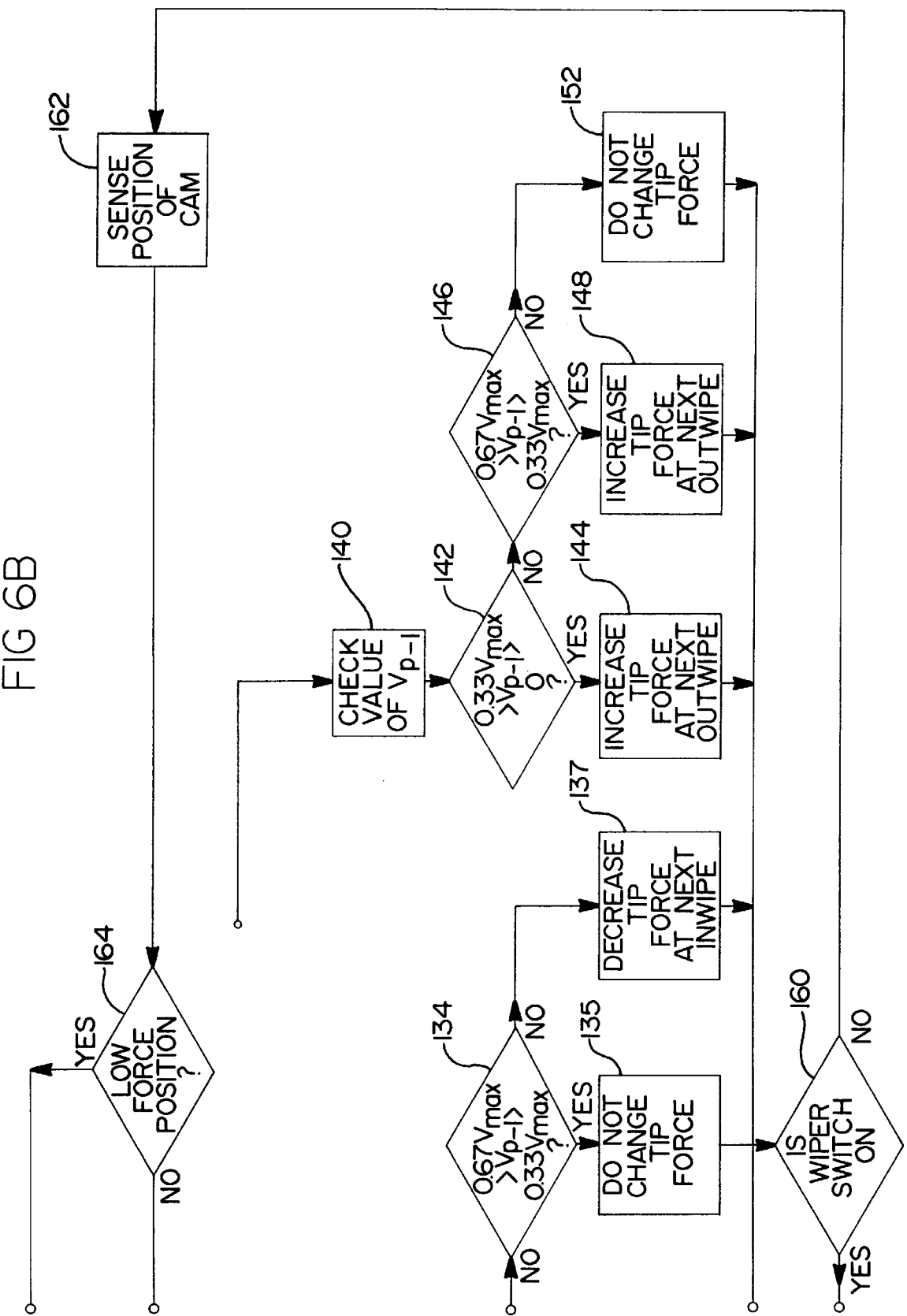

Referring to FIGS. 6(a) and 6(b), the operation of the variable force wiper control system by controller 65 is illustrated in flow-chart form. For shorthand purposes, V represents instantaneous, real time vehicle velocity, $V_p$ represents the most recent velocity measurement of the vehicle, $V_{max}$ is the maximum vehicle velocity and $V_{p-1}$ is the previous velocity measurement.

Figure 7:
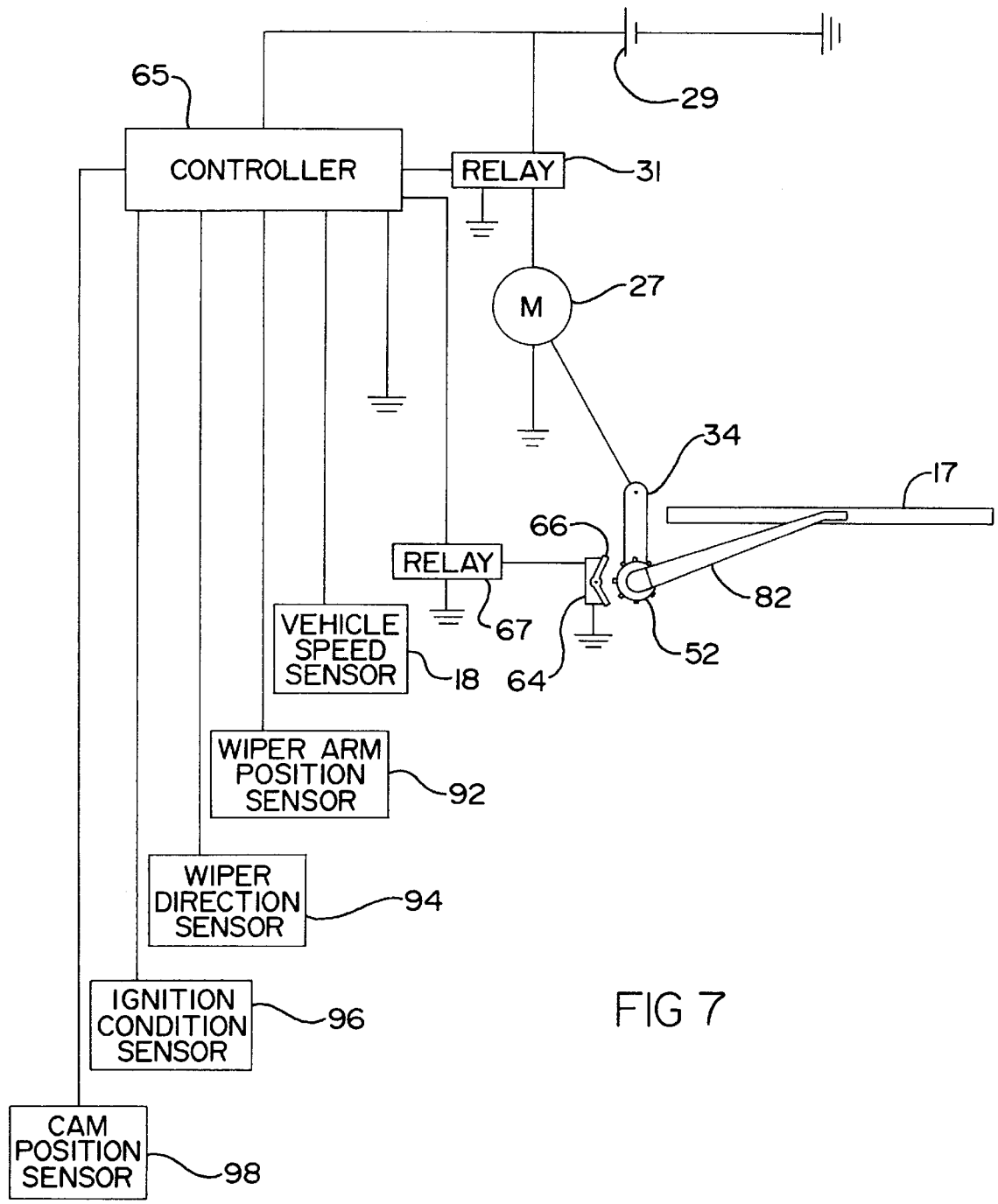
FIG. 7 is a schematic diagram of the wiper system.

In general, controller 65 monitors the velocity of the vehicle provided by vehicle speed sensor 18. A change in velocity is monitored by comparing the present vehicle velocity $V_p$ and the previous velocity $V_{p-1}$. If the vehicle velocity has changed, the wiper force is adjusted accordingly. Controller 65 also monitors a wiper arm position sensor 92, a wiper direction sensor 94, an ignition condition sensor 96 and a cam position sensor 98 as shown in FIG. 7.

The controller 65 initiates at step 100. Vehicle velocity V is zero when the vehicle is first started as shown in step 102. Step 104 checks to see whether the wiper switch within the vehicle is on, and is set to activate the wiper. If the wiper switch is not on, step 104 is repeated. If the wiper switch is on, the position of the drive shaft is sensed in step 106. The present vehicle velocity $V_p$ is sensed in step 108 with sensor 18 or another appropriate velocity sensor.

The controller 65 is programmed to apply one of three different force levels to wiper blades 17: a high force, a medium force and a low force associated with a low, medium, and high vehicle speed range respectively. Each of the force levels corresponds to an axial position of cam 50 within housing 40, 44. Of course, three is an arbitrary number and any number of levels may be employed, or the controller can alternatively be programmed to vary the force continuously with vehicle velocity. Step 110 checks whether the vehicle is operating in the low speed range with the present vehicle velocity $V_p$ being between $0.33V_{max}$ and zero. If the velocity is within that range, step 112 obtains the value of the previous velocity reading $V_{p-1}$. Step 114 checks if the previous velocity $V_{p-1}$ is also between $0.33V_{max}$ and zero. If the previous velocity $V_{p-1}$ is within that range, indicating the vehicle was previously operating in the low speed range, step 116 is executed which does not change the blade force against the windshield. Therefore, pawl 66 does not engage ratchets 62 of nut 52 to move cam 50 from the low force position.

When the previous velocity of the vehicle $V_{p-1}$ is not between zero and $0.33 V_{max}$ in step 114, step 118 is executed to determine whether the previous vehicle velocity $V_{p-1}$ is within the medium speed range between $0.33 V_{max}$ and $0.67 V_{max}$. If the previous vehicle velocity $V_{p-1}$ falls within that range, step 120 is executed to decrease the blade force by moving cam 50 from a mid-force position to a low-force position at the next in or downward wipe.

When the previous vehicle velocity $V_{p-1}$ is not between $0.67 V_{max}$ and $V_{max}$ in step 118, it can be concluded that $V_{p-1}$ is in the high speed range between $V_{max}$ and $0.67 V_{max}$, and step 124 therefore is executed to decrease the blade force by moving cam 50 from the high-force position to the low-force position in the next in or downward wipe interval.

When the velocity of the vehicle $V_p$ is not between zero and $0.33V_{max}$ in step 110, step 126 is executed to evaluate whether the vehicle velocity is between $0.33V_{max}$ and $0.67V_{max}$. If the vehicle velocity $V_p$ falls within that range, step 128 is executed to obtain the previous vehicle velocity $V_{p-1}$.

Step 130 is executed to determine if the previous vehicle velocity $V_{p-1}$ is in the range between zero and $0.33V_{max}$. If so, step 132 is executed to increase the blade force at the next out wipe by moving cam 50 from a low-force position to a mid-force position. When previous vehicle velocity $V_{p-1}$ is not between zero and $0.33V_{max}$, step 134 is executed in which previous vehicle velocity $V_{p-1}$ is compared to the range between $0.33V_{max}$ and $0.67V_{max}$. If previous vehicle velocity $V_{p-1}$ falls within that range, step 135 is executed in which the blade force is not changed by not moving cam 50, which should be in the mid-force position. If the previous vehicle velocity is not in that range, it is presumed that previous vehicle velocity $V_{p-1}$ is in the range $0.67V_{max}$ and $V_{max}$. With $V_{p-1}$ in that range, step 137 is executed in which the blade force is decreased by moving cam 50 from the high-force position to the mid-force position at the next in or downward wipe.

When the vehicle velocity is not between $0.33V_{ax}$ and $0.67V_{max}$ in step 126, vehicle velocity $V_p$ is presumed to be between $0.67V_{max}$, and $V_{max}$. When the vehicle velocity $V_p$ is within that range, the previous vehicle velocity $V_{p-1}$, is obtained in step 140. Step 142 is then executed to compare previous vehicle velocity $V_{p-1}$ with the range of 0 and $0.33V_{max}$. If the previous vehicle velocity is in that range, step 144 is executed in which the blade force is increased by moving cam 50 from the low-force position to the high-force position at the next out or upward cycle. If previous vehicle velocity $V_{p-1}$ is not between zero and $0.33V_{max}$, step 146 is executed to determine whether the previous velocity is between $0.33V_{max}$ and $0.67V_{max}$. If the previous vehicle velocity falls in that range, step 148 is executed. Step 148 increases the force by moving cam 50 from the mid-force position to the high-force position at the next out or upward cycle.

When previous vehicle velocity $V_{p-1}$ is not between $0.33V_{max}$ and $0.67V_{max}$ in step 146, previous vehicle velocity $V_{p-1}$ is presumed within the range between $0.67V_{max}$ and $V_{max}$. When previous vehicle velocity $V_{p-1}$ falls within that range, step 152 is executed in which the blade force is not changed.

After the blade force of the wiper arm is either increased, decreased or kept the same, step 160 is executed in which the wiper switch is checked to see whether it is still on. When the wiper switch is on, step 106 is executed and the sequence started again. When the wiper switch is not on in step 160, the position of cam 50 is checked in step 162. It is desirable to reduce the blade force to the low-force level if the cam 50 is not already in the low force reduced position. Step 164 determines whether the cam 50 is in the low force position. If the cam 50 is in the low-force position, step 104 is executed to determine whether this wiper switch is on. If cam 50 is not in the low-force position in step 164, step 166 checks whether the screw is in the medium force position. If cam 50 is in the mid-force position, step 168 is executed in which cam 50 is returned to the low-force position. Step 104 is then executed to determine whether the wiper switch is still on.

When the screw is not in the mid-force position in step 166, cam 50 is presumed to be in the high-force position.

When cam 50 is in the high-force position, step 172 is executed to move cam 50 to the low-force position. After step 172, step 104 is executed to determine whether the wiper switch is still on.

Steps 162 through 172 are executed to decrease the force on the wiper blade so that the wiper blade does wear excessively or become permanently deformed under the force.

It should be appreciated that one method of checking the range into which $V_{p-1}$ falls, in addition to storing and recalling a value in controller 65, is to determine the axial position of cam 50, or the corresponding position of the nut 52, pin 56 or rod 72, since they will correspond to the previous vehicle velocity $V_{p-1}$.

While the best mode for carrying out the present invention has been described in detail, those familiar with the art to which this invention relates will recognize various alternative designs and embodiments for practicing the invention as defined by the following claims.

What is claimed is:

1. A variable force wiper system for clearing a windshield of an automotive vehicle comprising:

a drive shaft having an axial bore defined therein;

a rod slidably disposed within the bore;

a wiper arm having a first end, a second end, and an intermediate portion joining said first and second end the first end of the wiper arm rotatably fixed to the drive shaft and the second end of the wiper arm being pivotable relative to the first end;

a wiper blade pivotably attached to the second end of the wiper arm;

a spring having a first end and a second end, the first end of the spring connected to the intermediate portion of said wiper arm biasing the wiper blade against the windshield;

a lever arm pivotably connected to the wiper arm at a pivot point proximate to the drive shaft of the lever arm having a first end spaced from the pivot point engaged by the rod and the lever arm operably pivoting responsive to axial movement of the rod and the lever arm having a second end connected to the second end of the spring, a cam rotatable about an axis and axially connected to the rod with the cam having threads; and a nut having threads with the threads of the nut being engaged by the threads of the cam wherein relative rotation between the nut and the cam axially displaces the rod and resultantly changes a force of the wiper blade against the windshield, wherein the drive shaft has an axially extending slot passing through the drive shaft in a radial direction and coinciding with the bore for a length of the axially extending slot, and wherein the cam encircles the drive shaft and is rotatably secured to the drive shaft by a pin extending transversely through the axially extending slot, the cam having external threads, a nut having an internal surface with internal threads and an outer surface with engagement surfaces formed thereon, the internal threads meshing with the external threads of the cam, the nut normally rotating with the cam on the drive shaft, and a pawl operatively engaged to the engagement surfaces to permit the screw to rotate relative to the nut with the rod resultantly moving axially relative to the drive shaft thereby causing the spring to change the bias of the wiper blade against the windshield.

2. A variable force windshield wiper system comprising:

a wiper arm having a first end and a second end;

adjustable biasing means connected to the wiper arm for providing an adjustable biasing force on the wiper arm toward a windshield;

a drive shaft connected to the first end of the wiper arm having an axial bore and an axially extending slot passing transversely through the drive shaft;

a wiper blade connected to the second end of the wiper arm;

a rod slidably received within the bore, the rod having a first end and a second end, the first end of the rod engaging the biasing means and increasing the biasing force as the rod extends from the bore;

a cam having an opening extending axially therethrough receiving the drive shaft, the cam having an outer surface having screw threads;

a pin extending across the cam and through the slot in the drive shaft and the pin axially supporting the rod in an axially moveable relation to the drive shaft;

a nut axially supporting the cam and having an internal surface and an external surface, the internal surface having threads for engaging the threads of the cam, the external surface having engagement surfaces formed thereon; and a pawl operatively engaged to the engagement surfaces to prevent the rotation of the nut with respect to the screw so that the screw moves the rod axially with respect to the drive shaft.

3. A variable force windshield wiper system as claimed in claim 2 further comprising a motor connected to the pawl for moving the pawl between engaged and disengaged positions.

4. A variable force windshield wiper system as claimed in claim 3 further comprising a controller and a speed sensor connected to the controller, the speed sensor having an output in proportion to a speed of the vehicle, the controller connected to the motor being configured to engage the pawl with the nut to adjust the amount of biasing force responsive to the speed of the vehicle.

5. A variable force windshield wiper system as claimed in claim 2 further comprising a drive arm connected to the shaft.

6. A variable force windshield wiper system as claimed in claim 3 wherein the bore is concentric with the drive shaft.

* * * * *